G. R. MUMMA.
SECTIONAL KILN.
APPLICATION FILED JUNE 29, 1914.
1,143,549.
Patented June 15, 1915.
2 SHEETS—SHEET 2.
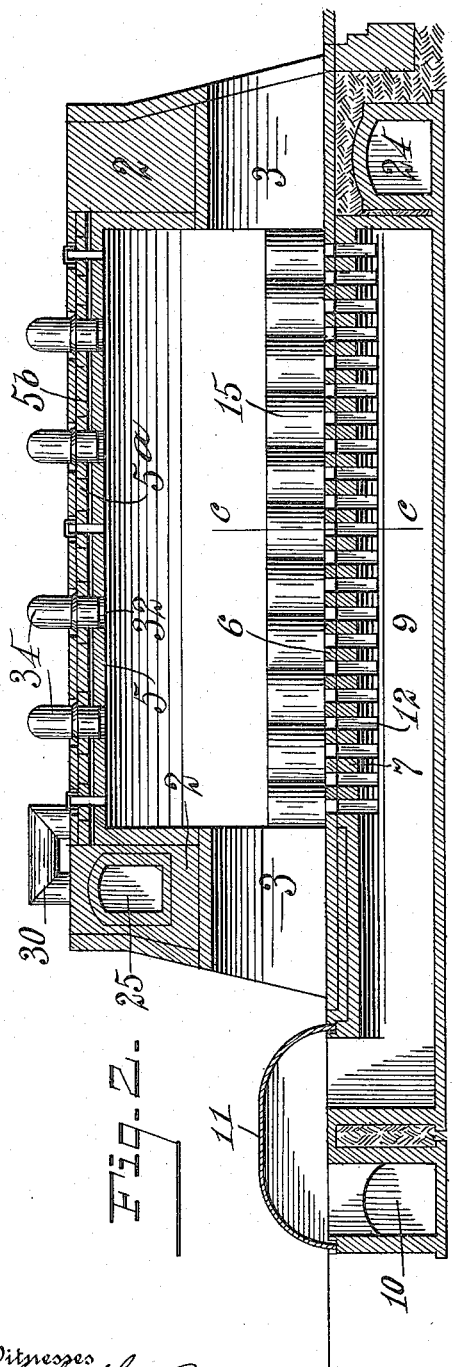
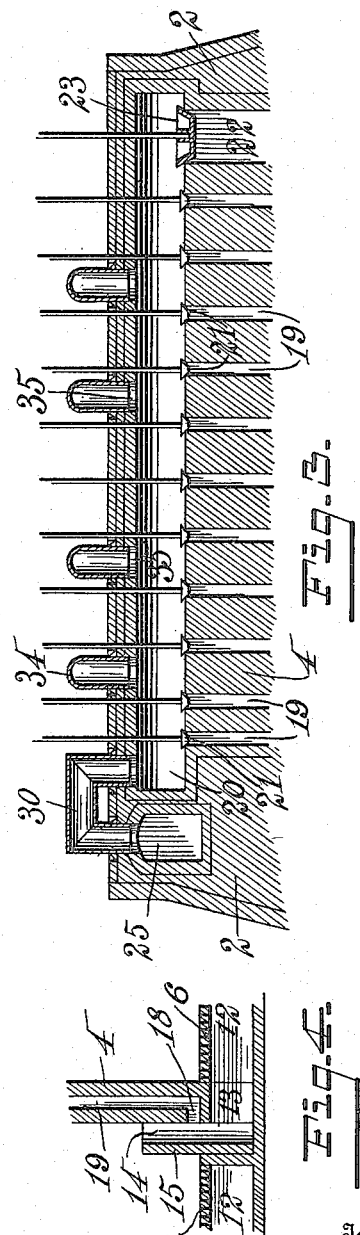

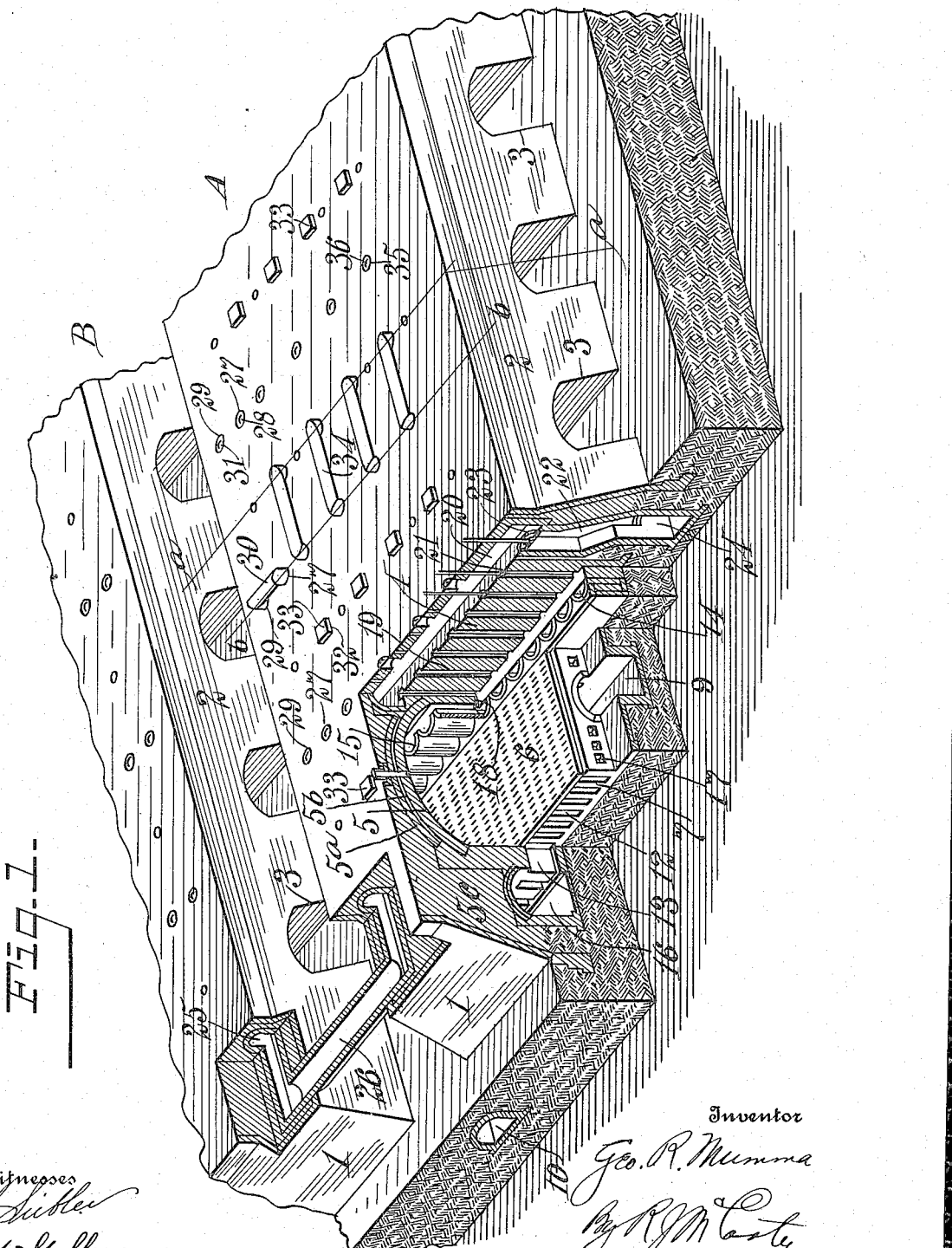

UNITED STATES PATENT OFFICE.

GEORGE R. MUMMA, OF DAYTON, OHIO, ASSIGNOR TO THE C. W. RAYMOND COMPANY, OF DAYTON, OHIO, A CORPORATION.

SECTIONAL KILN.

1,143,549.  Specification of Letters Patent. Patented June 15, 1915.

Application filed June 29, 1914. Serial No. 847,799.

*To all whom it may concern:*

Be it known that I, GEORGE R. MUMMA, a citizen of the United States, residing at Dayton, in the county of Montgomery and State of Ohio, have invented certain new and useful Improvements in Sectional Kilns; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in sectional kilns in which the various compartments thereof are fired successively, the green ware being placed in a compartment in advance of the compartment being fired and the burned ware being removed from a compartment in the rear of the compartment being fired. When the ware in one compartment is completely fired, the firing is advanced one compartment in the direction of the green ware. The kiln is generally fired by oil or producer gas, and the air for supporting combustion in the burning compartment passes through the compartments containing the cooling ware before it is introduced into the burning compartment, thereby preheating the air. The products of combustion from the burning compartments are introduced into the forward compartments containing the green ware before being conducted out of the kiln through the stack. The green ware is, therefore, gradually heated before being fired. This arrangement effects a great economy in fuel and produces a superior product. In kilns of this type it has been found advantageous to expel the moisture from the green ware before preheating the ware by the products of combustion. The moisture from the green ware is driven therefrom by air which has been previously heated by the cooling ware in the compartment in the extreme rear of the compartment being fired. This drying process is known as "water-smoking", and a special flue known as the "water-smoking" flue is provided in the kiln to conduct this heated air.

One object of the present invention is to provide a kiln of this type which is simple in construction and in which the various flues are inclosed within the kiln, thereby providing an unobstructed top which permits the operators to have easy access to the gas valves and other appliances.

Another object of the invention is to provide in a kiln of this type means whereby the arches of the compartments may easily expand and contract under the influence of heat. And another object of the invention is to provide a kiln of this type in which the individual gas flues for the compartments may be used in the water-smoking process thereby simplifying the construction of the kiln.

Referring to the accompanying drawings, Figure 1 is a perspective view, partially in section, of one end of a kiln constructed according to my invention; Fig. 2 is a section on the line $a$—$a$ of Fig. 1; Fig. 3 is a section on the line $b$—$b$ of Fig. 1; and Fig. 4 is a section on the line $c$—$c$ of Fig. 2.

In the specification and drawings, similar reference characters indicate corresponding parts.

In the present instance, I have illustrated the invention as applied to a kiln having two sections A and B, which construction permits access to be had to the compartments through both ends thereof. However, the invention is adaptable to kilns of other well known constructions. The two divisions of the kiln are of exact construction, but are turned end for end as will hereinafter appear. Only one division will, therefore, be described in detail. Each kiln division consists of end walls 1 and side walls 2 provided with tunnel doors 3 which give access to the various compartments. The kiln division also consists of division walls 4 which lie parallel with the end walls 1. The walls 4 join the side walls 2 at right angles and divide the kiln divisions into the various compartments. The division walls 4 are joined by arches 5 which form the tops of the compartments. Above the arches 5 an air space $5^b$ is provided by a sub-arch $5^a$. The sub-arch $5^a$ supports the insulation $5^c$ and prevents it coming in contact with the main arch 5. The air space $5^b$ is preserved by the sub-arch $5^a$ and the arches 5 are thus enabled to freely expand and contract under the influence of heat without disturbing the remainder of the kiln. The compartments are provided with perforated floors 6 through which said compartments communicate with flues 12 formed by parallel walls 7 beneath the floors 6. The flues 12 discharge into lateral flues 9 which may be connected with a main draft flue 10 by a hood 11 when it is desired to conduct the products of combustion or the heated air of the process of water-smoking out of the compartments. The flues 9 may be disconnected from the main draft flue by a well known form of cover plate (not shown) which closes the openings at the end of the tunnels and in the draft flue. The flues 12 communicate with the next adjacent compartment through ports 13 in the division walls 4. The ports 13 permit the products of combustion and the air being preheated to support combustion to pass from one compartment to another. The ports 13 discharge into the next compartment through uptakes 14 formed by semi-circular bag-walls 15 which lie against the division walls 4 along one side of the compartments. At opposite ends of each kiln division, the flues 12 discharge into cross flues 16 which connect the kiln divisions and which discharge into uptakes 14 through ports 13 in the end wall 1 of the opposite kiln division. The heated air and products of combustion may, therefore, be conducted from a compartment at one end of one kiln division into a compartment at the same end of the other kiln division. The compartments of both kiln divisions may, therefore, be operated consecutively. In the construction shown in the present instance only alternate flues 12 connect with ports 13. To permit the intermediate flues 12 to connect with the ports 13 the walls 7 are provided with ports 17. The uptakes 14 also act as burner openings for the compartments and the gas is delivered thereto through ports 13 in the division walls 4. The ports 13 connect with downtakes 19 which lead from gas ducts 20 at the top of each division wall 4. The passage of the gas into the downtakes 19 is controlled by individual valves 21. The gas is supplied to the gas ducts 20 through uptakes 22 in the outer side walls 2 between the tunnel doors 3. The passage of the gas into the ducts 20 is controlled by valves 23. The uptakes 22 lead from gas tunnels 24 which extend the length of the kiln divisions below the outer walls 2. The tunnels 24 lead from any suitable source of gas such as gas producers.

To permit the ware in the compartments to be water-smoked, the kiln is provided with a water-smoking flue 25 which lies along the top of the adjacent side walls 2 and is made continuous by ducts 26 which extend across the kiln divisions at the ends thereof. As the gas ducts 20 of the compartments containing the ware to be water-smoked are not performing their functions of conducting the gas when said compartments are being water-smoked, the gas duct 20 of any one compartment is utilized in distributing the hot air of the water-smoking process. During the water-smoking process the valves 21 and breachings 30 and 34 serve as dampers for the water-smoking flue. At the ends of the gas ducts 20, opposite the valves 23, said gas ducts are provided with ports 27 which are closed by caps 28 when not used in the water-smoking process. The ports 27 may be connected with ports 29 in the water-smoking flue 25 by breaching 30. The ports 29 are normally closed by caps 31. The air enters the cooling compartment through the ports 3 and, after the temperature thereof is elevated by the cooling ware, the air passes out of the compartment through ports 32 in the arches 5 at the top of the compartments. The ports 32 are normally closed by caps 33 and are connected with the gas ducts 20 by breaching 34 which enter the ports 32 and ports 35 in the top of the gas ducts 20. The ports 35 are normally closed by caps 36. After the heated air passes into one of the gas ducts 20, it is conducted into the water-smoking flue 25 by the breaching 30. The water-smoking flue 25 then conducts the heated air around the kiln and discharges it into the flue 20 of the compartment to be water-smoked through another breaching 30. It is to be understood, that, when the flues 20 are used in water-smoking, the said flues are disconnected from the gas tunnel by the valves 23. The heated air may be introduced into the compartment to be water-smoked through downtakes 19 and ducts 20 or through the top of the compartments through ports 32 and breaching 34. The circulation of air during the water-smoking process is produced by the products of combustion when passing up a stack (not shown) but which is well known and which connects with the main draft flue 10, it being remembered that both the products of combustion and air from the water-smoking flue discharge into the main draft flue. In some cases, however, a fan (not shown) may be provided in the main draft flue to provide for a draft. By thus constructing a kiln with the gas flues 20 having a double function, the kiln is of simple construction and gas ducts are eliminated from the top of the kiln, thereby permitting the operators to manipulate the breaching and valves without interference.

Having described my invention I claim.

1. A sectional kiln and the individual compartment gas flues thereof, said kiln being provided with ports above the compartments, said kiln being also provided with a continuous water-smoking flue, said gas flues and said water-smoking flue being provided with ports, breaching adapted to connect said gas and water-smoking flues through the last named ports, said gas flues being also provided with a second set of ports, and second breaching adapted to connect the gas flues and the compartments through the ports in the top of the kiln and the second named ports in the gas flues.

2. In a sectional kiln, the top, and the end side and division walls thereof, said divisional walls being provided with individual compartment gas flues, said sides being provided with a continuous water-smoking flue at their top, means for connecting said gas flues with said water-smoking flues, one of said sides being provided with a gas tunnel at the bottom thereof and uptakes which connect said tunnel with said gas flues, and a valve mounted at the upper end of each uptake.

In testimony whereof I affix my signature, in presence of two witnesses.

GEORGE R. MUMMA.

Witnesses:
R. J. McCarty,
Matthew Siebler.

Copies of this patent may be obtained for five cents each, by addressing the "Commissioner of Patents, Washington, D. C."